United States Patent [19]

Harig et al.

[11] 4,087,334
[45] May 2, 1978

[54] SEAL ARRANGEMENT FOR A ROTARY DRUM ASSEMBLY

[75] Inventors: Richard Francis Harig, Littleton, Colo.; Arthur Jacob Pietrusza, McMurray, Pa.; Albert Harry Riebel, Jr., Pittsburgh, PA; Harry James Kent, Pittsburgh, PA

[73] Assignee: Dravo Corporation, Pittsburgh, Pa.

[21] Appl. No.: 729,077

[22] Filed: Oct. 4, 1976

[51] Int. Cl.² .......... C10B 1/10; C10B 29/04; C10B 45/00; F27B 77/24
[52] U.S. Cl. .......... 202/269; 23/286; 34/129; 51/164; 165/89; 202/131; 202/136; 202/216; 202/218; 202/238; 366/235; 432/103; 432/106; 432/115; 432/242
[58] Field of Search .......... 202/131, 136, 216, 218, 202/238, 249, 269; 34/127–129, 242; 432/106, 115, 103, 242; 51/164; 23/286; 69/30; 99/630; 165/88, 89; 241/176; 259/3, 14–16, 49–53, 57, 58, 81 R–90, 175–177; 418/104, 105, 111, 116, 117, 124, 140

[56] References Cited

U.S. PATENT DOCUMENTS

| 2,517,470 | 8/1950 | Erisman | 432/103 |
| 2,826,403 | 3/1958 | Moklebust | 432/115 |
| 3,068,015 | 12/1962 | Roubal | 277/101 |
| 3,155,380 | 11/1964 | Lessard | 432/106 |
| 3,376,202 | 4/1968 | Mescher | 202/269 |
| 3,477,704 | 11/1969 | Sherwood | 432/115 |
| 3,502,139 | 3/1970 | Andersen | 165/88 |
| 3,690,628 | 9/1972 | Kamstrup-Larsen | 432/106 |
| 3,709,474 | 1/1973 | Kamstrup-Larsen | 432/106 |
| 3,724,887 | 4/1973 | Roberts | 432/115 |
| 3,836,324 | 9/1974 | Shaefer et al. | 432/115 |
| 3,923,450 | 12/1975 | Inoue et al. | 432/115 |
| 3,940,239 | 2/1976 | Rossi et al. | 432/115 |

Primary Examiner—Morris O. Wolk
Assistant Examiner—Bradley Garris
Attorney, Agent, or Firm—Stanley J. Price, Jr.; John M. Adams

[57] ABSTRACT

A first cylindrical drum member having an inlet portion for receiving materials to be treated, such as preheated coal and char includes a longitudinal axis and an outlet portion through which the treated materials are discharged into the inlet end portion of a second cylindrical drum member. The second drum member is independently supported for rotation relative to the first drum member and has a longitudinal axis coplanarly aligned with the longitudinal axis of the first drum member such that the drum members are concentrically positioned in tandem relative. A sealing assembly is connected to the first and second drum members for longitudinal movement with the drum members during expansion and contraction of the drum members as they are subjected to different temperatures. The sealing assembly includes a running seal member that is secured to the periphery of the respective drum members and a static seal ring assembly that is movably positioned on the outer cylindrical surface of an annular support member that surrounds the respective drum members. A plurality of piston cylinder assemblies surround the annular support member, and each includes a piston rod arranged in abutting relation with the static seal ring assembly to maintain the seal ring assembly in sealing relation with the running seal upon longitudinal movement of the first drum member.

16 Claims, 15 Drawing Figures

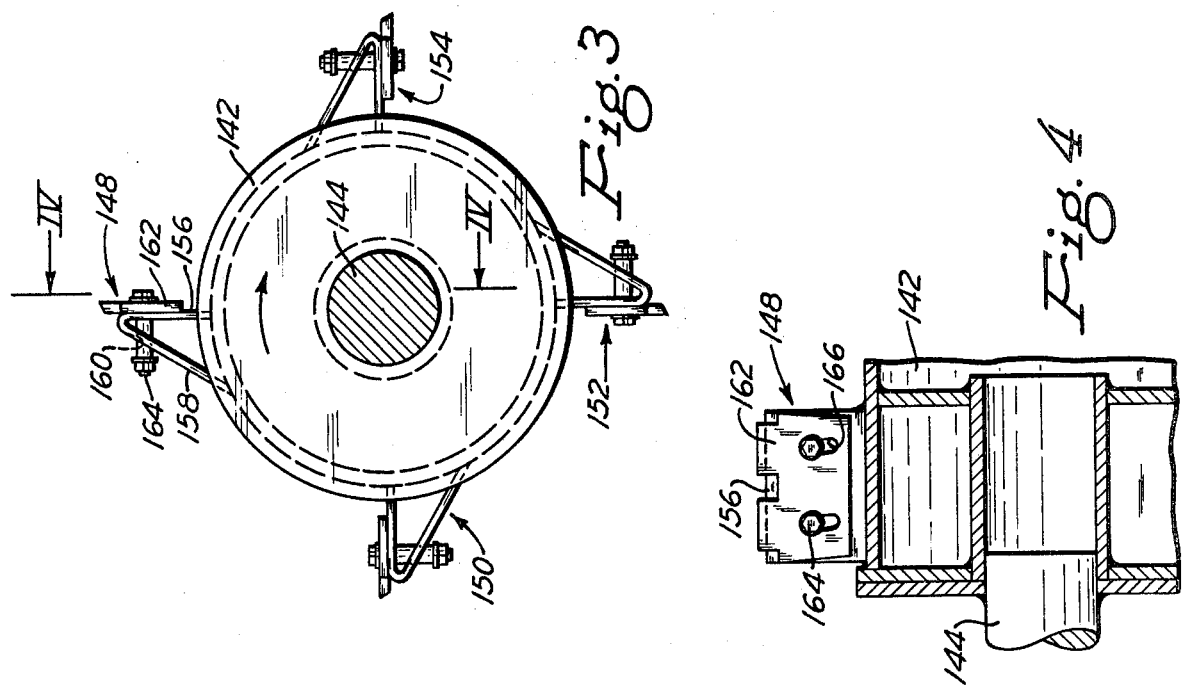
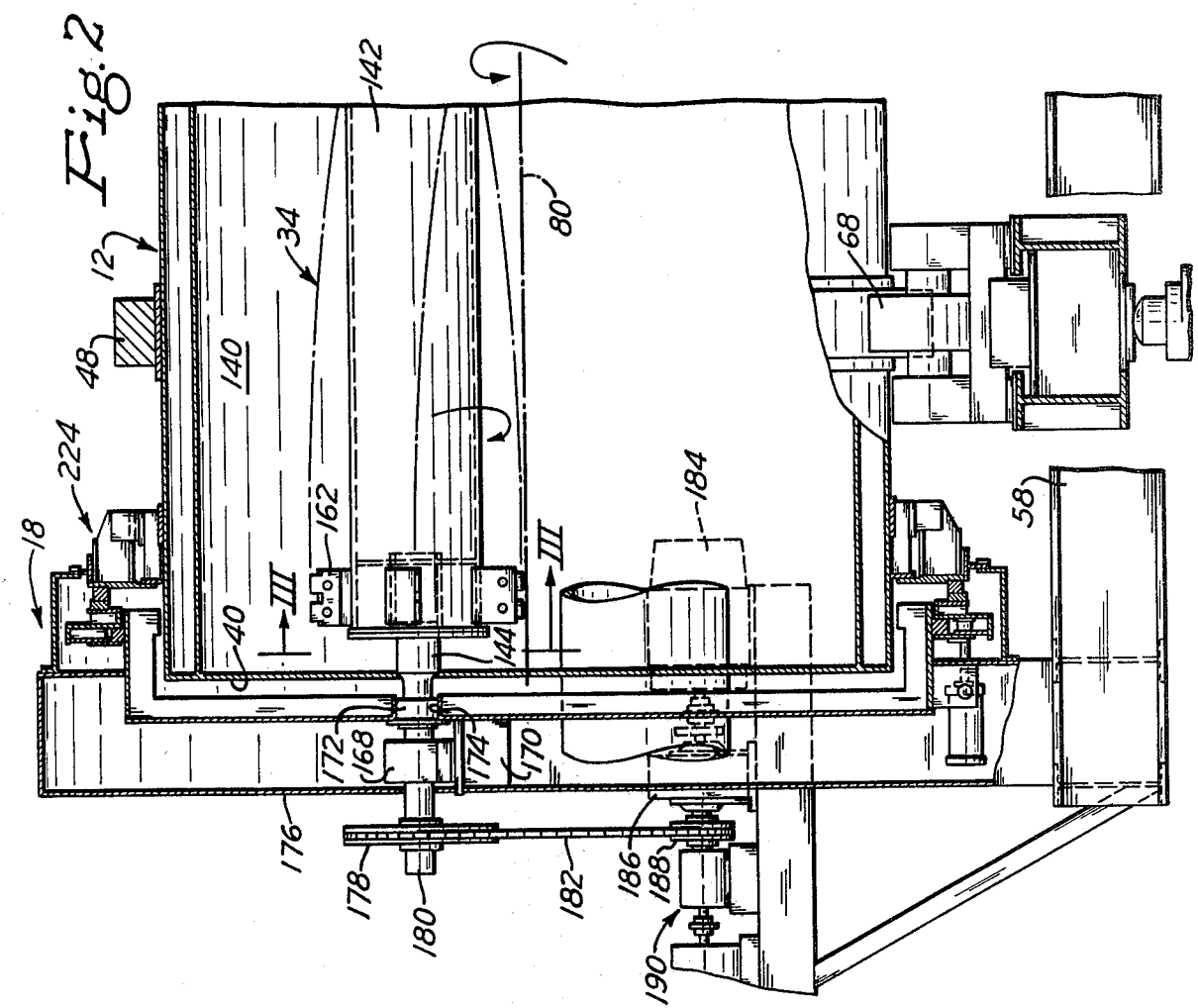

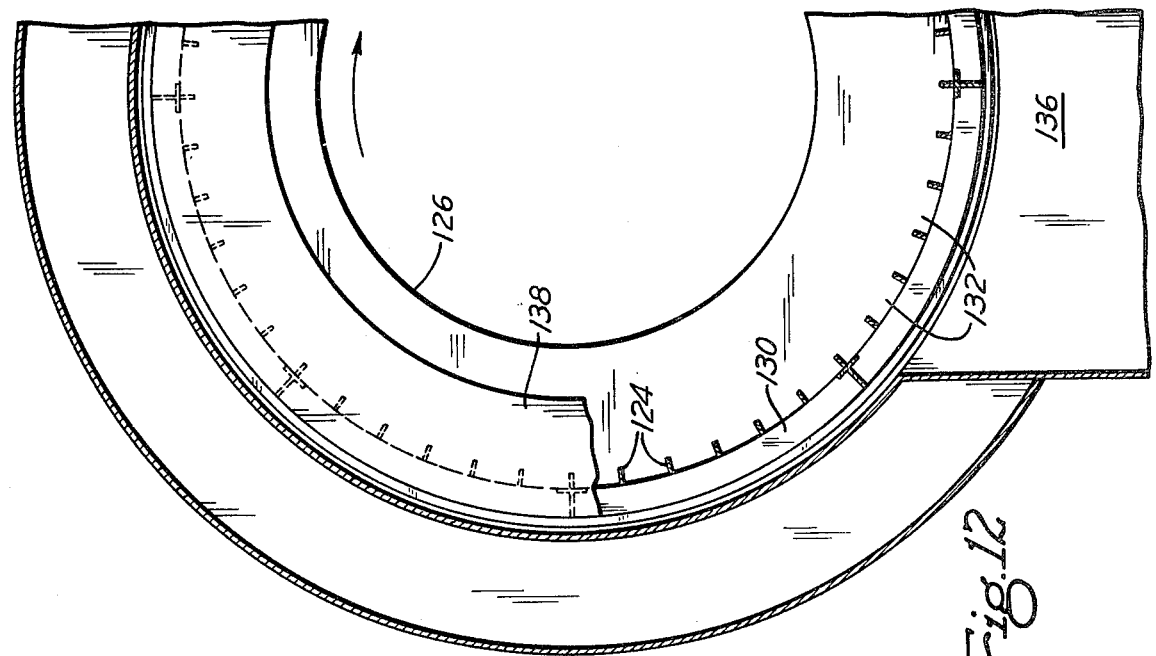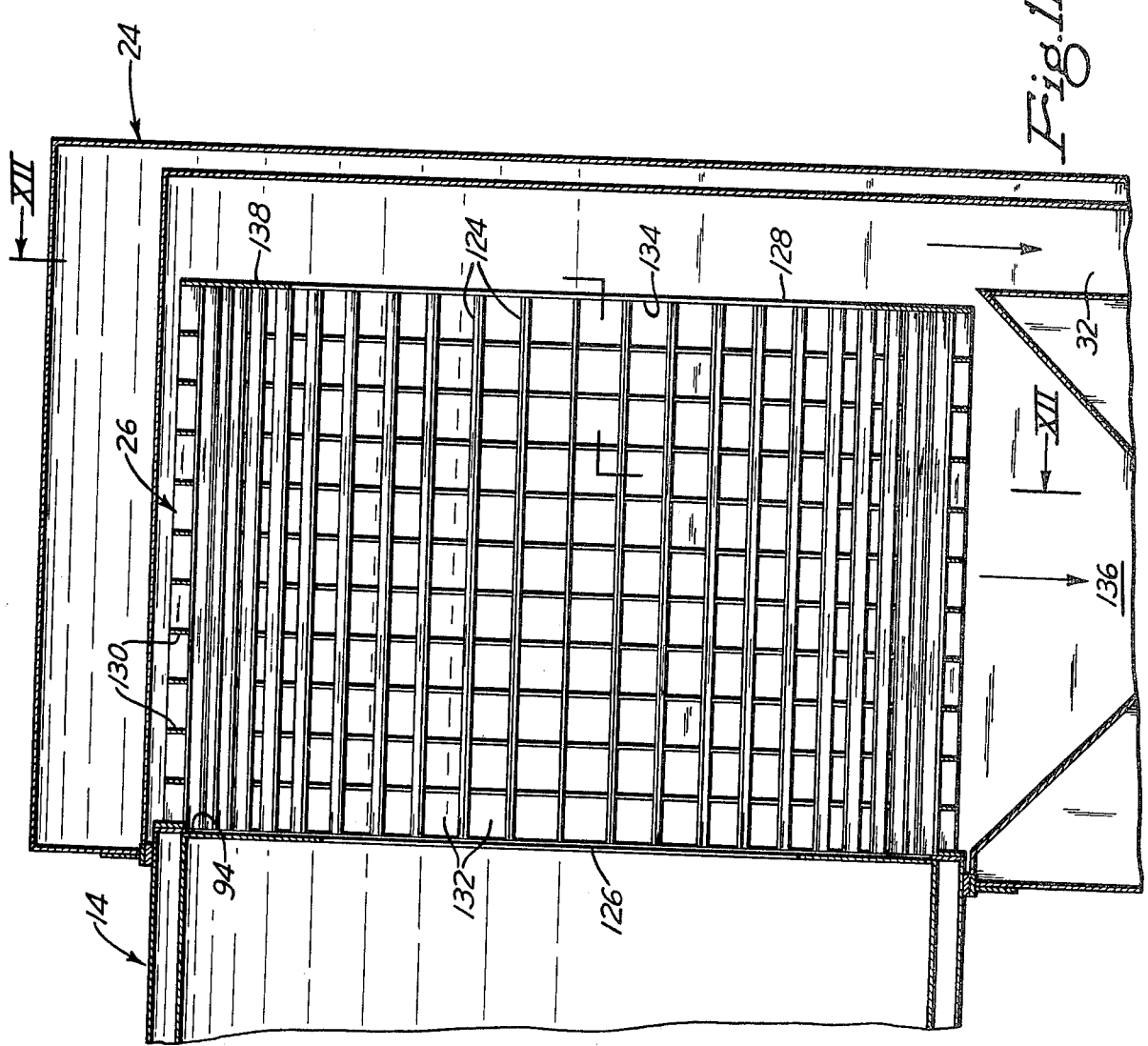

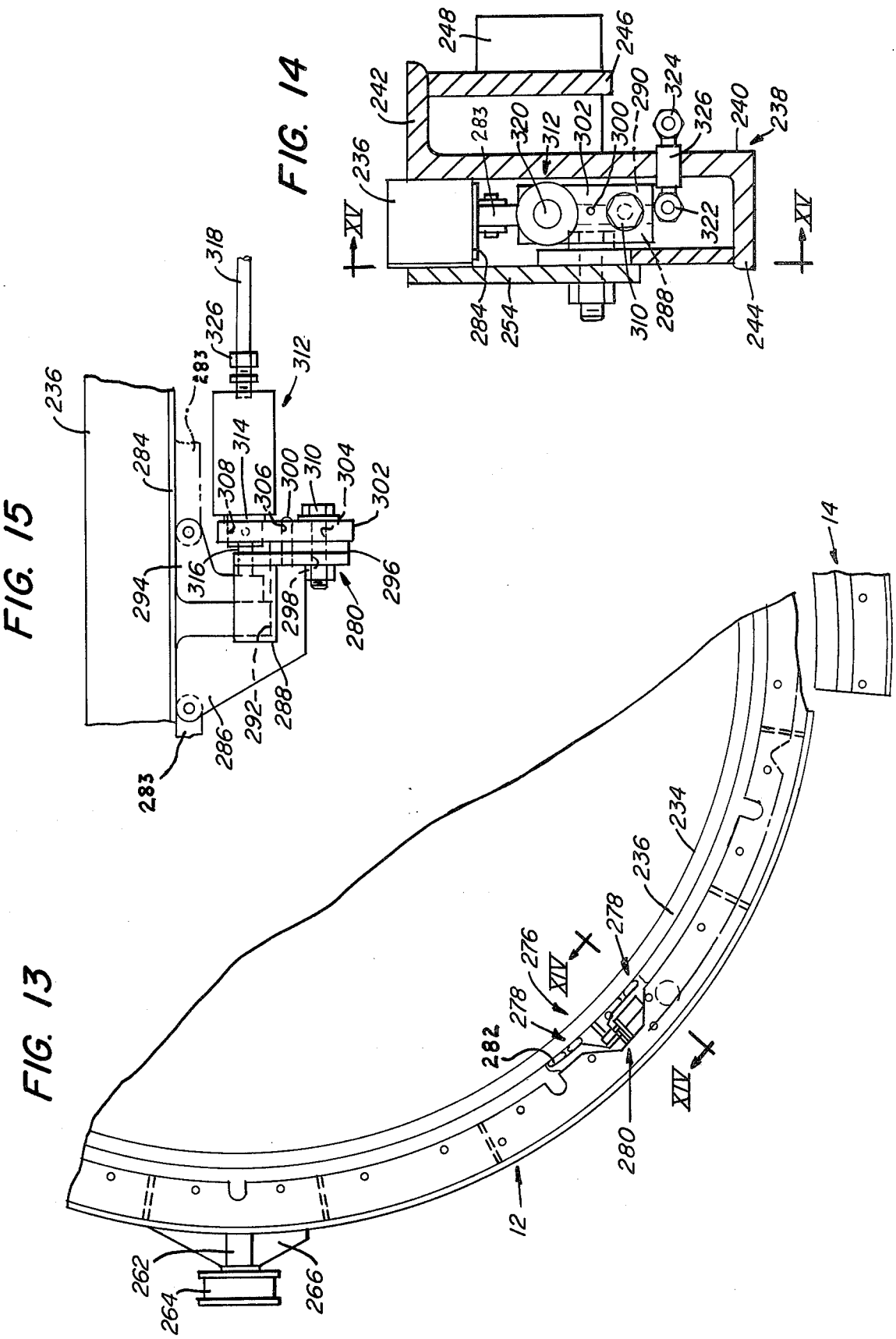

SEAL ARRANGEMENT FOR A ROTARY DRUM ASSEMBLY

BACKGROUND OF THE INVENTION

1. Field of the Invention

This invention relates to a rotary drum assembly for treating materials and more particularly to a rotary drum assembly having a pair of drum members connected for relative movement and maintained in sealing relation by a sealing assembly surrounding the end portions of the drum members.

2. Description of the Prior Art

In the process of making formcoke, as described in U.S. Pat. Nos. 3,073,351; 3,401,089 and 3,562,783, particulate bituminous coal and finely divided char (the solid carbonaceous residue of coal which has been distilled at a temperature of between 800° and 1400° F) are introduced into a rotary drum. Depending on the type of coal employed and the ratio of coal to char, pitch may also be added as a binder. The preheated coal and char supply substantially all of the sensible heat required to achieve the desired temperature for agglomerating the carbonaceous materials. The materials are intimately mixed by rotation of the drum. As the constituents are mixed, the coal particles are further heated to such an extent that partial distillation of the coal particles occurs, evolving tar and forming a loosely coherent plastic, sticky mass in the rotary drum. Rotation of the drum forms relatively fine plastic particles which grow in size as a result of the rolling or tumbling action of the particles on the upper surface of the plastic mass in the drum. The agglomerates grow in size until the binder evolved by the coal particles and the pitch binder, if employed, loses its plasticity. Thereafter, the agglomerates in the drum rigidify or harden to form uniformly sized agglomerates that are discharged from the outlet portion of the drum.

Rotary drums for agglomerating finely divided solid material disclosed in U.S. Pat. Nos. 2,778,056; 2,695,221 and 1,921,114; British patent specification No. 779,302 and Canadian Pat. No. 627,037 utilize a single drum in which the process steps of mixing, forming and hardening of the agglomerative materials to form the agglomerated product take place. It is essential during the process of mixing, forming and hardening the agglomerates that an inert atmosphere is maintained within the internal portions of the rotary drum. This inert atmosphere is maintained by the gases evolved from the agglomerative materials during the agglomeration process. To maintain the inert atmosphere, it is essential that a pressure exceeding atmospheric pressure (i.e. positive pressure) be maintained within the drum. Therefore, the end portions of the drum, as well as the access openings thereto, must be sealed in a substantially fluid-tight arrangement to prevent the escape of gas from the internal portion of the drum except the gas that is exhausted from the drum into the material. The seal also serves to maintain a preselected positive pressure therein.

A problem is encountered in maintaining a fluid-tight seal within the drum because of the fact that the temperature of the internal portion of the drum may vary considerably from the time that the constituents are first introduced into the drum and the final agglomerated product is discharged from the drum. Consequently, the drum experiences a substantial temperature change resulting in expansion and contraction of the drum. The longitudinal movement of the drum, due to expansion and contraction, presents a problem in maintaining a fluid-tight seal. Frequently, the seals are broken and gas escapes from the internal portion of the drum and consequently the desired pressure inside the drum cannot be maintained.

In treating materials there is need for a rotary drum assembly that is effectively sealed to maintain a preselected pressure within the drum and capable of compensating for expansion and contraction of the rotary drum assembly which occurs during the treating process.

SUMMARY OF THE INVENTION

In accordance with the present invention, there is provided a rotary drum assembly that includes a first cylindrical drum member having an inlet portion for receiving materials to be treated and an outlet portion for discharging the treated materials. A second cylindrical drum member having an inlet portion receives the material from the first drum member and discharges further treated material from a discharge end portion thereof. A sealing assembly is connected to the first and second drums and is operable to effect a fluid-tight seal therebetween. The sealing assembly is arranged on the first and second drum members to maintain a fluid-tight seal between the drum members upon axial movement thereof.

A center breech housing extends around the outlet portion of the first drum member and the inlet portion of the second drum member. The sealing assembly is positioned between the center breech housing and the first drum member and between the center breech housing and the second drum member. The center breech housing is fixed relative to the first and second drum members. The sealing assembly includes a rotatable seal portion and a static seal portion to provide a fluid seal between the fixed center breech housing and the rotatable first and second drum members.

An annular carrier ring surrounds the first and second drum members and includes a plurality of rearwardly extending plate members that are each secured to the annular carrier ring at one end portion and at the other end portion for the first drum member to the outlet portion thereof and for the second drum member to the inlet portion thereof. With this arrangement, the plate members connect the annular carrier ring to the respective drum members on opposite sides of the center breech assembly. An annular seal ring is secured to each of the annular carrier rings. The annular seal ring for the first drum member moves axially with the first drum member during expansion and contraction of the first drum member and further rotates with the first drum member.

An annular support member is mounted on the fixed cylindrical portion of the center breech assembly. The annular support member has an outer cylindrical surface. The static seal portion of the sealing assembly is supported on the outer cylindrical surface of the annular support member and is movable therewith. The static seal portion includes a ring assembly having a forwardly extending portion and a rearwardly extending portion. A first annular seal member is secured to the ring assembly forwardly extending portion and is positioned in abutting and sealing relation with the annular seal ring secured to the annular carrier ring of the respective drum members. A second annular seal member is supported by the ring assembly on the annular support member outer cylindrical surface for longitudinal movement to provide a seal between the ring assembly and the center breech housing fixed cylindrical portion.

A plurality of piston cylinder assemblies are positioned around and secured to the annular support member outer cylindrical surface, and each includes an extensible piston rod having an end portion that is secured to the ring assembly. The piston cylinder assemblies are operable to maintain the piston rods thereof in abutting relation with the ring assembly to thereby urge the static seal portion in abutting relation with the annular seal ring. In this manner, a seal is maintained between the static seal portion and the annular seal ring during expansion and contraction of the first and second drum members and axial displacement of one drum relative to the other drum.

Expansion and contraction of the first drum member is compensated for by the sealing assembly by operation of the piston cylinder assemblies to maintain positive pressure against the ring assembly. As the first drum member expands, a force is transmitted through the annular seal ring on the annular carrier ring to the static seal portion of the ring assembly. Also, during contraction of the first drum member, the piston cylinder assemblies function to longitudinally move the ring assembly on the outer cylindrical surface of the annular support member to maintain the static seal portion in sealing relation with the annular seal ring.

A sealing assembly is also provided between the inlet portion of the first drum member and a feed end breech that extends therearound. In a similar arrangement, a sealing assembly is provided between the outlet end of the second drum member and a discharge end breech that extends therearound. With this arrangement, separate sealing assemblies seal the inner portion of the respective drum members.

Accordingly, the principal object of the present invention is to provide a rotary drum assembly having a pair of longitudinally aligned cylindrical drum members in which the inner portion of the drum members are effectively sealed during expansion and contraction of the drums and axial displacement of one drum relative to the other drum.

Another object of the present invention is to provide a sealing assembly that maintains a fluid-tight seal between a pair of rotary drum members of a rotary drum assembly and thereby maintains a pressure above atmospheric within the drum members while forming agglomerates of agglomerative material.

Another object of the present invention is to provide a plurality of breech assemblies that seal the internal portion of a rotary drum assembly for forming an agglomerated product from agglomerative materials by a plurality of sealing assemblies that are secured to the respective breech assemblies and are movable with the drum assembly relative to the respective breech assemblies to compensate for expansion and contraction of the drum members of the drum assembly.

An additional object of the present invention is to provide a rotary drum assembly that includes a pair of longitudinally aligned drum members surrounded by a fixed center breech housing with a seal assembly having a rotatable seal portion and a static seal portion arranged to provide a fluid seal between the fixed center breech housing and the rotatable drum members.

These and other objects of the present invention will be more completely disclosed and described in the following specification, the accompanying drawings and the appended claims.

BRIEF DESCRIPTION OF THE DRAWINGS

FIG. 2 is a fragmentary sectional view in side elevation of the balling drum feed end, illustrating the seal means for the feed end of the balling drum and the manner in which one end of the rotary scraper is rotatably mounted and driven.

FIG. 3 is a view in section and elevation taken along the line III—III of FIG. 2, illustrating the blade configuration of the rotary scraper.

FIG. 4 is a view in section taken along the line IV—IV of FIG. 3, illustrating in detail the manner in which the scraper blades are adjustably secured to the rotary scraper body portion.

FIG. 11 is a view in side elevation and in section of the integral trommel screen connected to the discharge portion of the hardening drum.

FIG. 12 is a view in section taken along the line XII—XII of FIG. 11, illustrating in end elevation the trommel screen.

FIG. 13 is a fragmentary view in end elevation of the balling drum and the hardening drum, illustrating the chain assembly for maintaining the static seal ring assembly in abutting and sealing relation with the annular support member.

FIG. 14 is a sectional view in side elevation taken along line XIV—XIV of FIG. 13, illustrating one of the piston cylinder assemblies for connecting adjacent end portions of the chain assembly for maintaining preselected tension in the chain assembly.

FIG. 15 is a sectional view in side elevation taken along line XV—XV of FIG. 14, illustrating the connection of the end links of adjacent sections of the chain assembly by the piston cylinder assembly.

DESCRIPTION OF THE PREFERRED EMBODIMENT

Figure 1:
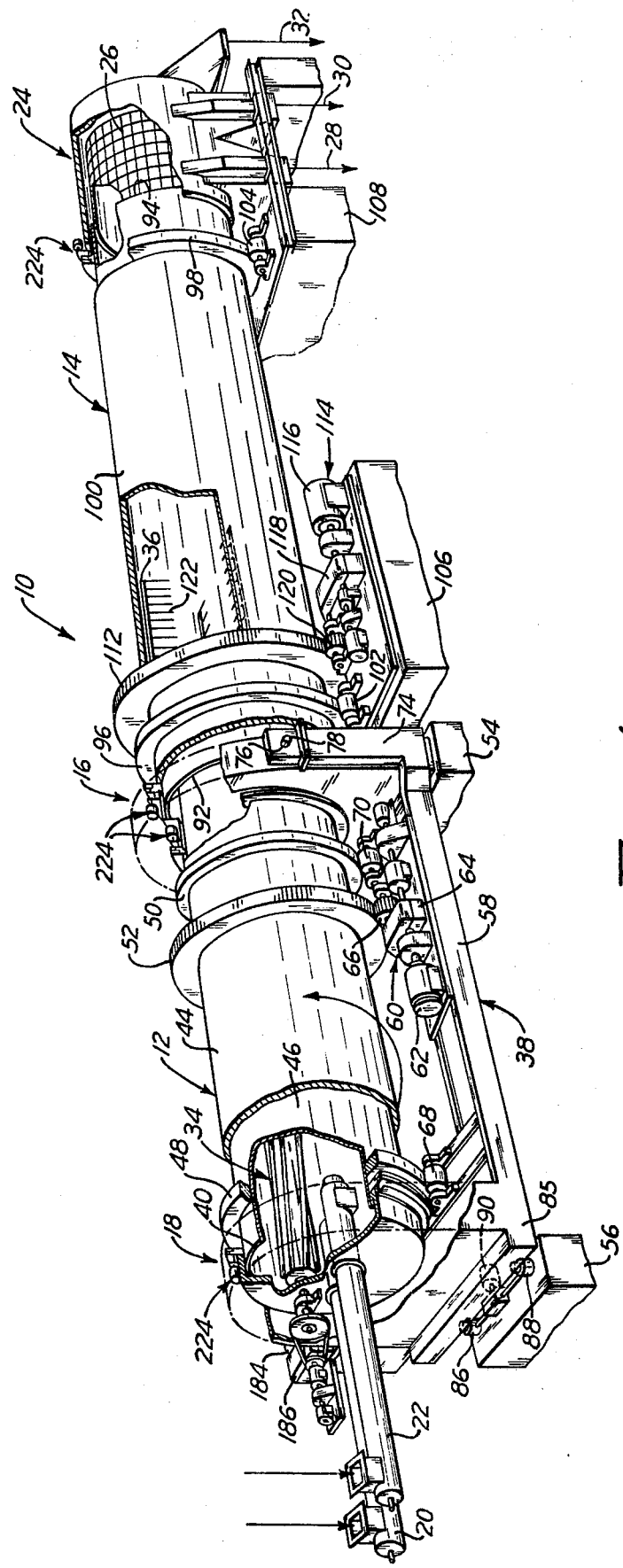
FIG. 1 is a perspective view of the rotary drum assembly that includes separate balling and hardening drums with portions broken away to illustrate the mechanical seal between the respective drums, the rotary scraper in the balling drum, the rakes in the hardening drum and the integral trommel screen.

Referring to the drawings and particularly FIG. 1, the rotary drum assembly generally designated by the numeral 10 includes a balling drum 12 and a hardening drum 14. The balling drum 12 is longitudinally aligned and concentrically positioned in tandem relation with the hardening drum 14. The balling drum 12 has its discharge portion extending into the inlet portion of the hardening drum. This arrangement facilitates the transfer of the friable agglomerated material from the balling drum 12 to the hardening drum 14 with a minimum degradation of material during the transfer. A center breech assembly 16 extends around the discharge end portion of the balling drum 12 and the inlet end of hardening drum 14 and, as later discussed, provides a suitable seal for the respective drums to maintain a positive pressure within the drum assembly 10. A feed end breech assembly 18 surrounds the feed end of the balling drum 12 and also has suitable seals, as later discussed, to maintain the positive pressure within the drum assembly 10.

A pair of feed screw conveyors 20 and 22 extend through suitable seals in the feed end breech 18 and are arranged to supply agglomerative material, such as coal and char, to the inner portion of the balling drum 12. The discharge end of the hardening drum 14 extends into a discharge end breech assembly 24 which also has suitable seal means to provide positive pressure within the drum assembly 10. A trommel screen 26 is secured to the discharge end of the hardening drum 14 and is positioned within the discharge breech assembly 24. The discharge breech assembly 24 has a plurality of outlets 28, 30 and 32 for the material agglomerated in the drum assembly 10. The agglomerated product having the desired size is arranged to be discharged from the drum assembly 10 through outlets 28 and 30 and the oversized product is discharged through outlet 32.

A rotary scraper assembly generally designated by the numeral 34 is supported within the balling drum 12 and is arranged to control the thickness of the agglomerative material deposited on the inner wall of the balling drum 12 and as described in co-pending application, Ser. No. 466,833, now abandoned, entitled "Method And Apparatus For Agglomerating Finely Divided Agglomerative Materials In A Rotating Drum", provide ridges and valleys within the balling drum 12 to aid in the mixing and agglomeration of the agglomerative material within balling drum 12.

Positioned within hardening drum 14 are a plurality of rakes 36 that extend radially therein and are arranged to assist in controlling the size of the agglomerated material that is rigidifed within the hardening drum 14. Suitable drive means, later described, rotate the balling drum 12 and hardening drum 14 at different peripheral speeds and rotate the rotary scraper assembly 34 at a preselected speed.

The balling drum 12 is supported on a platform assembly generally designated by the numeral 38 that is pivotally secured at one end to the center breech assembly 16. The platform assembly 38 is arranged to change the angle of inclination of the balling drum 12 to thereby control the rate of flow of the agglomerative material through the balling drum 12. The balling and hardening drums 12 and 14 are so arranged that their longitudinal axes intersect at a location coincident with the pivot axis of the platform assembly 38 so that the platform pivots the balling drum 12 at the intersection of the balling drum and hardening drum axes.

With the above arrangement, agglomerative material as, for example, particulate coal and finely divided char, previously heated to an elevated temperature is introduced through the conveyors 20 and 22 into the balling drum assembly 12. The preheated coal and char are arranged to supply as sensible heat substantially all of the heat required to achieve the desired temperature for agglomerating the carbonaceous materials. An inert atmosphere is maintained within the drum assembly 10 and a positive pressure of between one and three inches water is maintained within the drum assembly 10 by means of the seals provided at the breech assemblies 16, 18 and 24.

The balling drum 12 is rotated at a preselected speed to effect intimate mixing of the constituents and tumbling of the agglomerates as they are formed in the balling drum 12. As the constituents are admixed in the balling drum the coal particles are further heated to an extent that partial distillation of the coal particles occurs evolving tar and forming a loosely coherent, plastic sticky mass in the balling drum 12. Where desired, a pitch binder may also be supplied to the balling drum 12 to further contribute to the agglomeration of the carbonaceous material within the balling drum. The loosely coherent, plastic mass formed in the balling drum 12 breaks up during tumbling into relatively fine plastic particles. Growth of the plastic particles within the balling drum 12 is attained by a snowballing type of tumbling or rolling action on the upper exposed surface of the plastic mass of particulate material in the balling drum 12.

A portion of the plastic mass is deposited on the inner wall of the balling drum 12 and the rotary scraper controls the thickness of the plastic mass so deposited and further forms ridges and valleys in the deposited material to improve the mixing and tumbling of the particles as they agglomerate.

The agglomerates so formed within the balling drum 12 continue to grow until the binder evolved by the coal particles and pitch, if employed, loses its plasticity. The agglomerates so formed are conveyed by the rotation of the balling drum 12 into the hardening drum 14. In the hardening drum 14 the remaining binder is evolved from the agglomerates and the agglomerates rigidify in the hardening drum 14 as substantially uniformly sized agglomerates.

The rotation of the hardening drum 14 conveys the rigidified agglomerates to the trommel screen 26 where agglomerates of a preselected size are discharged through the openings in the trommel screen and through outlets 28 and 30. The oversized agglomerates that do not pass through the openings in the trommel screen 26 are discharged through the opening 32. The oversized agglomerates may be crushed and recycled as a constituent of the feed introduced into the balling drum 12. The product of the preselected size recovered through outlets 28 and 30 is thereafter calcined in a calcining vessel at an elevated temperature of between 1500° F and 1800° F to form a formcoke that has strength and abrasion resistance that is equal or superior to that of conventional blast furnace coke.

The balling drum 12 has a generally cylindrical configuration with an inlet end portion 40 and an outlet end portion 43 (FIGS. 1, 2, 5, 6 and 8). A suitable insulation material 44 may be positioned on the outer surface of the drum body portion 46 to reduce heat loss through the wall of the balling drum 12 during the agglomeration process. The balling drum 12 has a pair of steel tires or riding rings 48 and 50 adjacent the inlet end portion 40 and the discharge end portion 42. A drive ring gear 52 is secured to the outer surface of the balling drum 12 between the rings 48 and 50.

Figure 6:
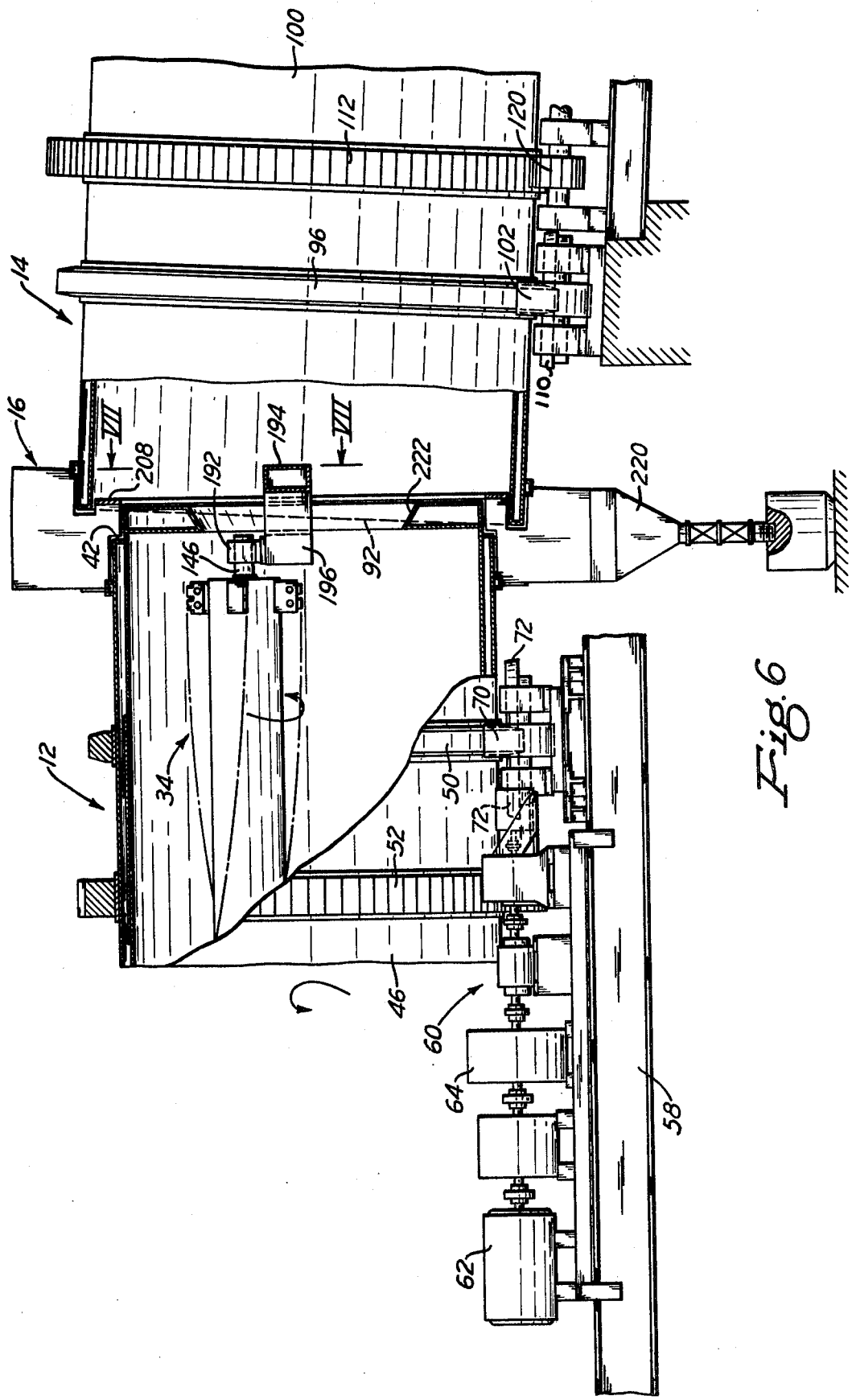
FIG. 6 is a fragmentary view in side elevation of the balling drum discharge end and the hardening drum inlet portion, illustrating the manner in which the opposite end portion of the rotary scraper is supported within the balling drum.

The center breech assembly 16 is supported on a fixed pad 54 and the front end of the platform 38 is supported on a second fixed pad 56. The platform assembly 38 includes a frame member 58 positioned beneath the balling drum 12. Mounted on the frame member 58 is a separate balling drum drive assembly generally designated by the numeral 60 that includes a drive motor 62, a reducer 64 and a pinion gear 66 that meshes with the drive ring gear 52. The riding rings 48 and 50 are supported on pairs of trunnion rollers 68 and 70 with suitable thrust wheels 72 abutting the sides of the respective rings 48 and 50 as illustrated in FIG. 6.

Figure 8:
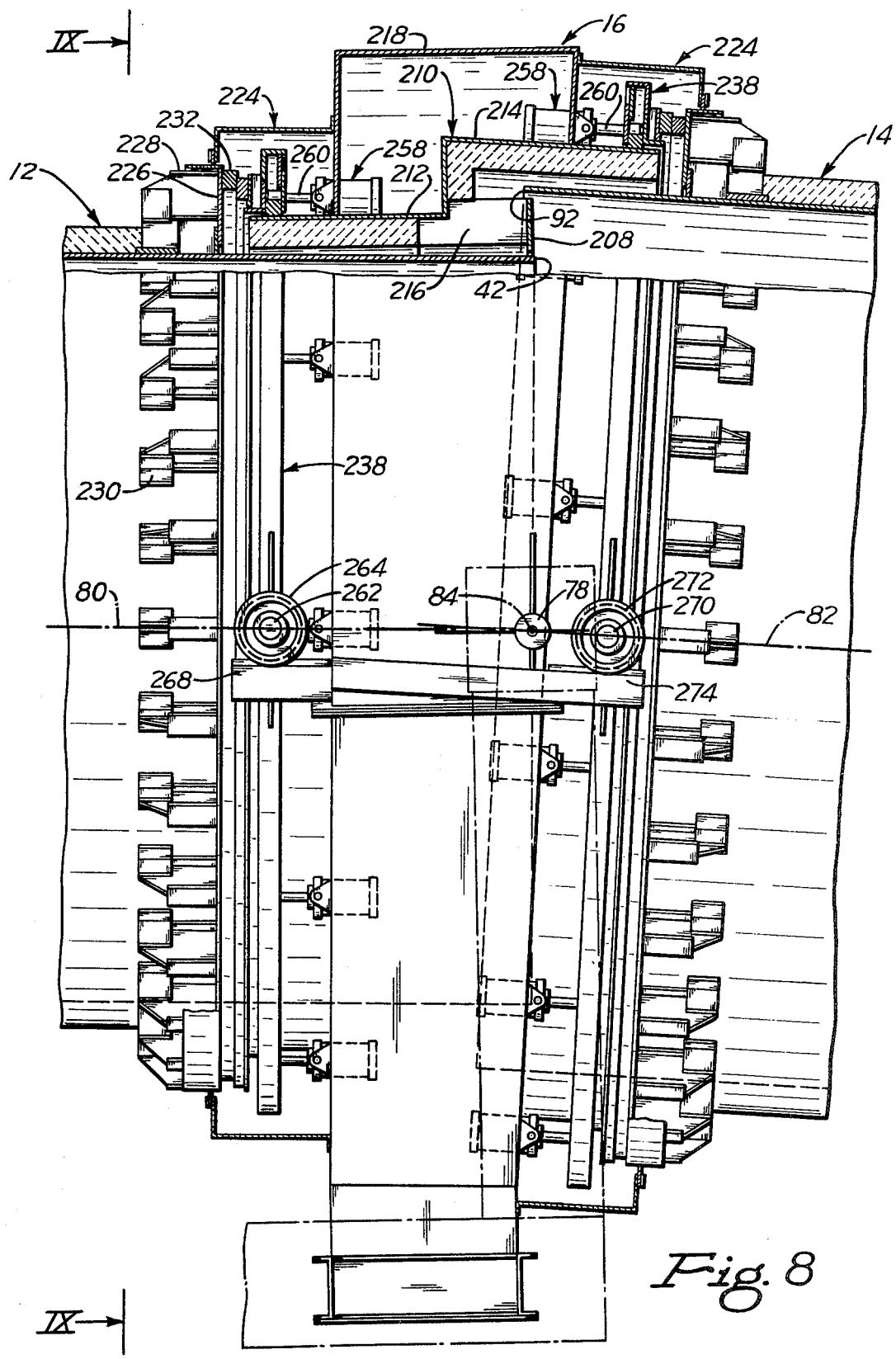
FIG. 8 is a fragmentary view in side elevation and partially in section, illustrating the mechanical seal means for the discharge portion of the balling drum and the inlet portion of the hardening drum.
Figure 9:
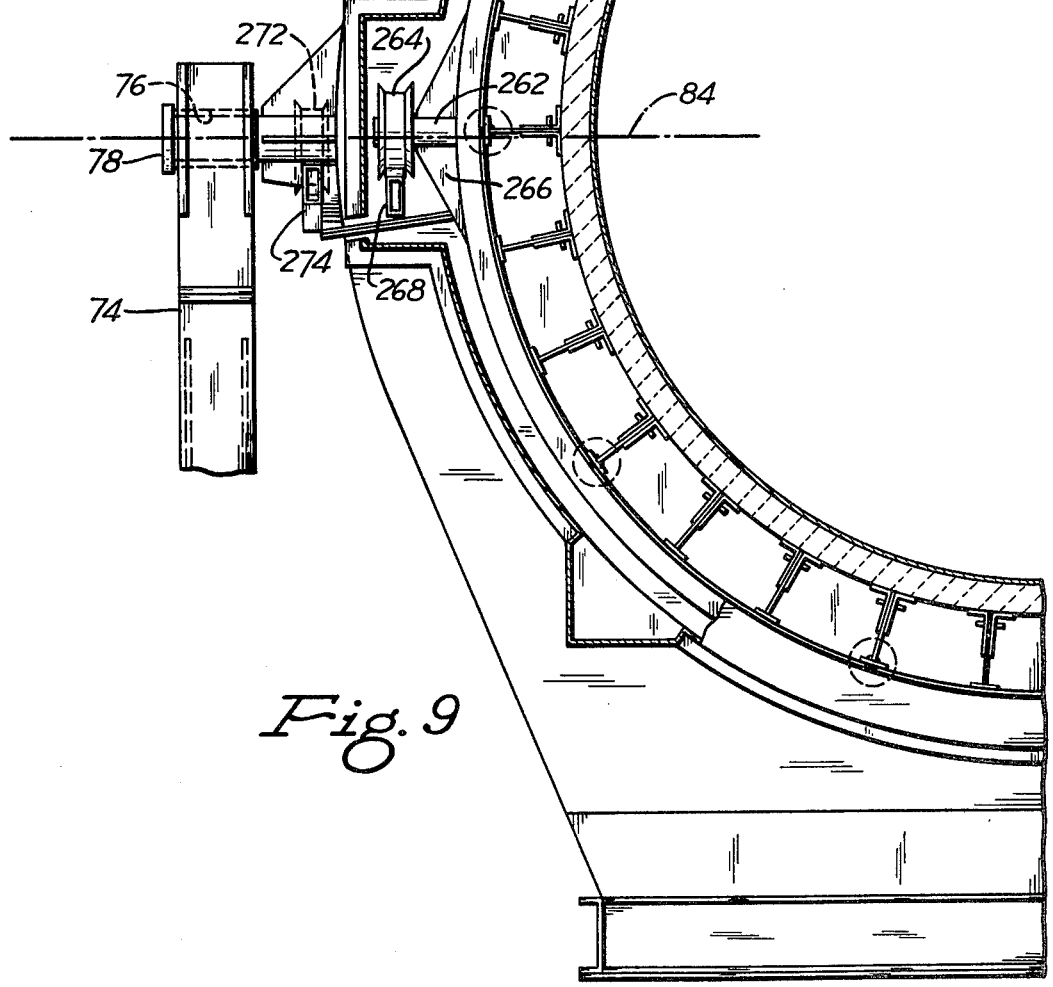
FIG. 9 is a fragmentary view, partially in section and in end elevation taken along the line IX—IX of FIG. 8, illustrating the means to compensate for expansion and contraction of the respective drums.

The platform assembly frame member 58 has a pair of upstanding leg portions 74; one of which is illustrated in detail in FIGS. 1 and 9. The upstanding leg portions have bores 76 therethrough adjacent the upper end portion. The center breech assembly 16 has a pair of trunnion shafts 78 extending outwardly therefrom through the bores 76 in frame member leg portions 74 to thus support that portion of the frame member 58 adjacent the balling drum discharge end portion 42. As is illustrated in FIGS. 8 and 9 the longitudinal axis 80 of balling drum 12 intersects the longitudinal axis 82 of the hardening drum 14 at the axis 84 formed by the trunnion shafts 78 so that the balling drum support platform 38 pivots about the intersection of the axes 80 and 82.

The frame 58 has a front end portion 85 which is mounted on a plurality of jack devices 86 and 88. The jack devices 86 and 88 are supported on pad 56 and are arranged to be driven by a motor 90 to raise and lower the frame front end portion 85 and thus pivot the frame about the trunnion shafts 78 and adjust the slope of balling drum 12 relative to the hardening drum 14. It should be noted with this arrangement the balling drum pivots about the intersection of the axes 80 and 82 as previously described.

The hardening drum 14 has a generally cylindrical configuration with an inlet end portion 92 and an outlet end portion 94. Although not illustrated in FIG. 1, the hardening drum body portion 100 has a suitable layer of insulation material secured thereto to reduce heat transfer therethrough during the agglomeration process. A pair of steel tires or annular rings 96 and 98 are secured to the hardening drum body portion 100 adjacent the inlet and outlet end portions. Pairs of trunnion rollers 102 and 104 are supported on fixed pads 106 and 108 and rotatably support the hardening drum 14. At the feed end of drum 14 thrust wheels 110 maintain the ring 96 in operative position on the trunnion roller 102, as illustrated in FIG. 6. The platforms 106 and 108 are so constructed to provide the desired angle of inclination for the hardening drum 14.

The hardening drum body portion 100 has a ring gear 112 secured thereto adjacent the ring 96. A hardening drum drive assembly generally designated by the numeral 114 is supported on the pad 106 and includes a motor 116, a reducer 118 and a pinion gear 120 meshing with the ring gear 112. With this arrangement, the hardening drum 14 may be rotated at a preselected speed that is independent of the speed of rotation of the balling drum 12. Secured to the inner wall of hardening drum body portion 100 are a plurality of rakes 36 that have inwardly extending tines 122. The rakes 36 extend longitudinally throughout a portion of the hardening drum 14 and are arranged as described in U.S. Pat. No. 3,628,012 and U.S. Pat. No. 3,460,195 to control the size consist of the agglomerates during the hardening process and before the agglomerates have rigidified.

As is illustrated in FIGS. 11 and 12, the hardening drum 14 has a cylindrical trommel screen 26 secured to the discharge end portion 94. The trommel screen has a generally cylindrical configuration with longitudinally extending bars 124 secured to circular end members 126 and 128. The bars 124 are arranged in preselected spaced relation to each other. A plurality of cylindrical bars 130 are arranged in spaced relation around the longitudinal bars 124 to form generally rectangular openings designated by the numeral 132 through which agglomerates having a preselected size may pass. Agglomerates of a preselected size pass through the spaces 132 and the oversized agglomerates are discharged from the trommel screen open end portion 134. With this arrangement, the integral trommel screen 26 rotates with the hardening drum 14 and as the agglomerates are discharged from the discharge end portion of the hardening drum 14 the agglomerates move longitudinally along the trommel screen 26. The rotation of the trommel screen 26 tumbles the rigidified agglomerates so that the agglomerates of a size less than the openings 132 in trommel screen 26 pass through the openings 132 into the discharge chute 136. An annular ring member 138 is secured to the discharge end portion 134 of trommel screen 26 to form a dam so that the agglomerates are tumbled within the trommel screen and agglomerates of the preselected size are not readily discharged through the trommel screen outlet 134 into the oversized product discharge opening 32.

The rotary scraper 34 is rotatably positioned within the balling drum 12 and the support for the front end of the rotary scraper is illustrated in FIG. 2. The support for the rear end of the rotary scraper 34 adjacent the balling drum discharge end portion 42 is illustrated in FIGS. 5, 6 and 7.

The rotary scraper 34 is rotatably positioned within the balling drum 12 in spaced relation to the drum inner wall 140 and is preferably located above a horizontal plane extending through the balling drum axis 80 and on the left side of a vertical plane extending through the drum axis 80. With this arrangement, the rotary scraper 34 is positioned in the upper left quadrant of the cylindrical opening in the balling drum 12. The position of the rotary scraper 34 is determined by the direction of drum rotation so that the scraper is positioned in a quadrant opposite to that of the inclined bed of agglomerative material.

Figure 5:
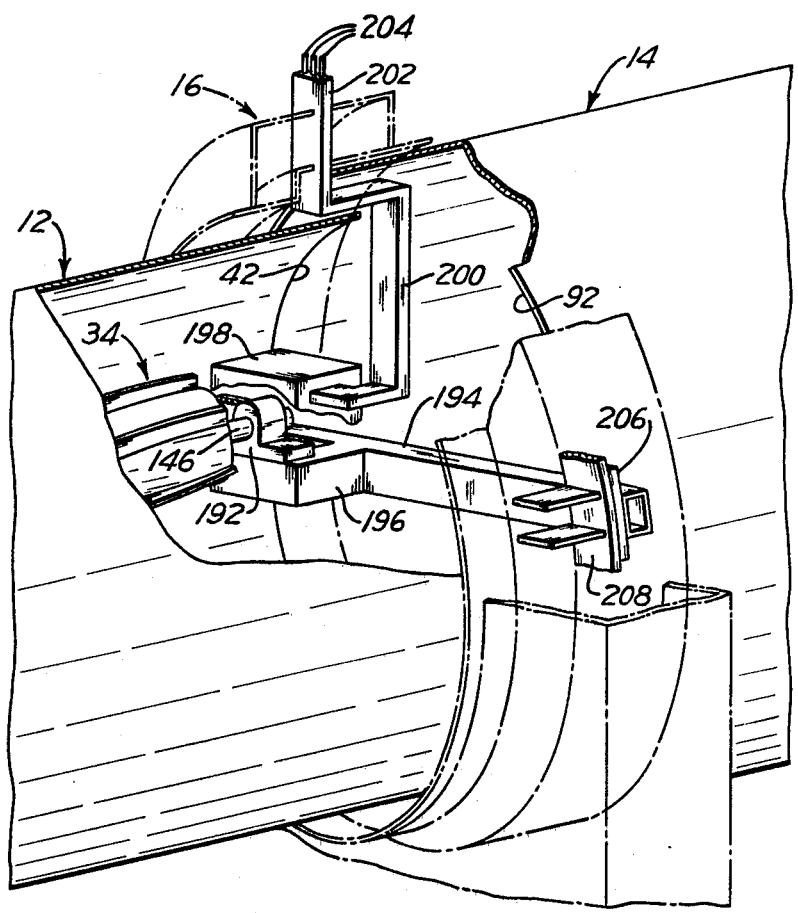
FIG. 5 is a fragmentary perspective view of the balling drum discharge portion, illustrating the support means for the opposite end of the rotary scraper.
Figure 7:
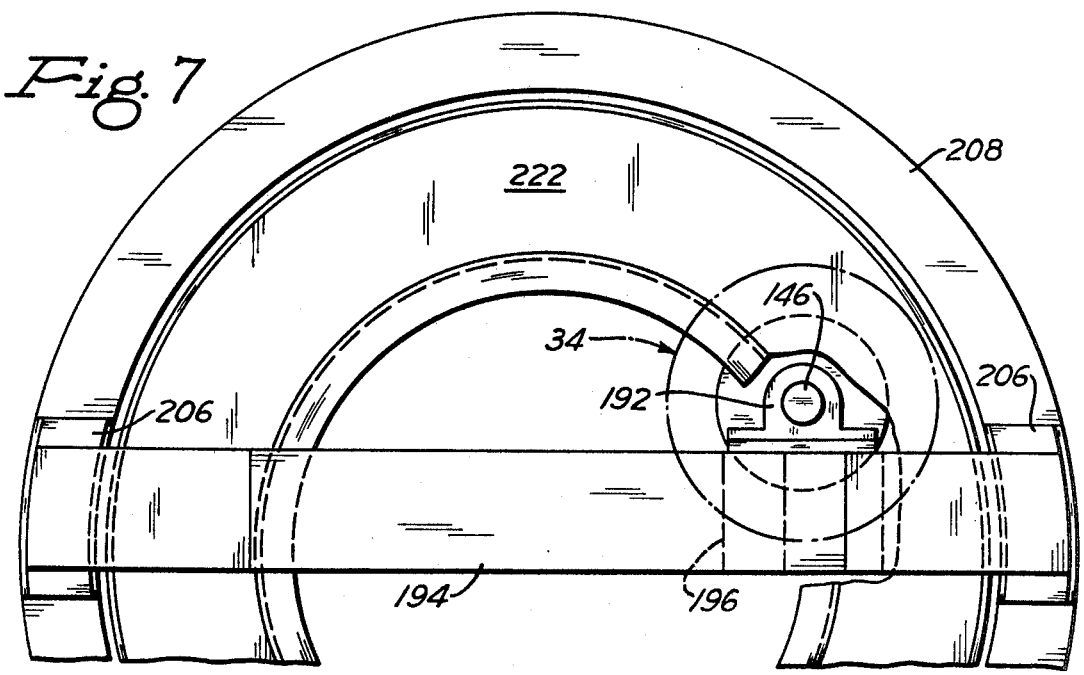
FIG. 7 is a view taken along the line VII—VII of FIG. 6, illustrating the transverse beam supporting the end portion of the rotary scraper.

The rotary scraper 34 has a tubular body portion 142 with a front shaft 144 secured thereto and extending forwardly therefrom (FIG. 2) and a rear shaft 146 secured thereto and extending rearwardly therefrom (FIGS. 5 – 7). The scraper 34 has four rows of scraper blade assemblies (FIG. 3) generally designated by the numerals 148, 150, 152 and 154 secured to the outer surface of the tube 142. Each of the blade assemblies (FIG. 4) includes a blade support member 156 with a rearwardly extending leg portion 158. The support member 156 and leg portion 158 have apertures 160 therethrough. The blade support members 156 and the rearwardly extending leg portions 158 are rigidly secured to the surface of the tube 142 as by welding or the like. Separate blade segments 162 are secured to the blade support members 156 by means of bolts 164 extending through the aligned apertures 160 and the elongated slots 166 in the blade segments 162. The slots 166 in the blade segments 162 permit radial adjustment of the blade segments 162 on the blade supports 156.

The rows of blade assemblies 148 – 154 extend lengthwise along the tube 142 to form elongated continuous cutting surfaces along substantially the entire length of the scraper 34. The blade segments are equidistantly positioned on the periphery of the scraper tube 142 to provide symmetrical ridges and valleys in the layer of agglomerative material deposited on the balling drum inner wall 140. The continuous cutting surface formed by the rows of blade segments 162 follow a helical path as diagrammatically illustrated by the —.— line in FIG. 2. The blade segments 162 may be arranged in a preselected helical configuration or arranged parallel to the longitudinal axis of the scraper tube 142. With this arrangement, the rotary scraper 34 forms ridges and valleys in a layer of agglomerative material deposited on the inner wall 140 of balling drum 12 in which the ridges serve as lifters to admix the agglomerative constituents and aid in forming agglomerates of a preselected size range from the agglomerative materials.

As illustrated in FIG. 2, the rotary scraper front shaft 144 is rotatably supported in a pillow block bearing 168 that is mounted on a structural member 170 and extends through a suitable seal 172 positioned in an aperture 174 of a housing 176. The housing 176 surrounds the balling drum feed end breech 18. The structural member 170 is secured to the housing 176. A sprocket 178 is nonrotatably secured to the shaft end portion 180 of front shaft 144 that projects through the housing 176.

The drive mechanism for rotating the scraper 34 includes an endless chain 182 that is reeved about the sprocket 178 and is drivingly connected to a motor 184 through a suitable speed reducer 186, and a drive sprocket 188 is nonrotatably connected to the drive shaft of the reducer 186. Thus, the scraper 34 is arranged to rotate preferably in a direction opposite to the direction of rotation of the balling drum 12 as indicated by the directional arrow. A suitable overdrive clutch mechanism 190 is provided for auxiliary drive of the scraper.

As illustrated in FIGS. 5, 6 and 7, the rotary scraper rear shaft 146 is supported in a pillow block bearing 192 within the balling drum 12 adjacent the balling drum discharge end portion 42. The pillow block bearing 192 is supported by a transverse beam member 194 that is positioned within the hardening drum 14 beyond the balling drum outlet end portion 42. It should be noted that the outer diameter of the balling drum 12 is smaller than the inner diameter of the hardening drum 14 so that the discharge end portion 42 of balling drum 12 extends into and beyond the inlet end portion 92 of hardening drum 14. The transverse beam member 194 has a forwardly extending portion 196 that extends into the rear discharge portion of balling drum 12 and the pillow block bearing 192 is secured to and supported on the forwardly extending portion 196. A housing 198 extends around the pillow block bearing 192 and has a conduit 200 connected to an opening in the housing 198. The conduit 200 extends between the outlet end portion of balling drum 12 and the inlet end portion 92 of hardening drum 14 and has a portion 202 extending through the housing of the center breech 16. A plurality of service lines 204 extend through the conduit 200 to the housing 198 and supply lubricant under pressure to the pillow block bearing 192 and a coolant fluid to maintain the temperature of the bearing below a preselected temperature.

The transverse member 194 is secured to and supported by the center breech 16 as is illustrated in FIGS. 5, 6 and 7. The transverse member 194 has a generally rectangular configuration and has a pair of arcuate pads 206 (FIG. 5) secured to an annular ring member 208 that forms a part of the center breech 16 and is illustrated in FIGS. 6 and 7. The ring member remains fixed with the center breech 16 and supports the transverse member 194. The ring member 208 has an outer diameter smaller than the inner diameter of the hardening drum 14 and extends within the hardening drum 14 on the inby side of the hardening drum inlet end portion 92. With this arrangement, the rear bearing 192 is supported within the balling drum 12.

The center breech assembly is illustrated in detail in FIGS. 8 and 9 and includes an annular support member 210 that has a first portion 212 extending around the balling drum discharge end portion 42 and an outwardly offset second portion 214 that extends around the inlet end portion 92 of hardening drum 14. The annular portion 210 has suitable refractory material to limit heat transfer therethrough and has a longitudinal dimension sufficient to extend over the outlet end of balling drum 12 and the inlet end of hardening drum 14. As illustrated in FIG. 8, the annular ring 208 previously described is supported within the inlet end portion of hardening drum 14 by means of plate 216 secured to and extending from the annular support member 210. A metallic housing 218 extends around the annular member 210 and has, as illustrated in FIG. 6, a receiver 220 for the agglomerative material that collects within the receiver 220. A dam 222, illustrated in FIG. 6, is secured to the discharge end portion of the balling drum 12 and controls the rate of discharge of the agglomerates from the balling drum 12 to the hardening drum 14.

Figure 10:
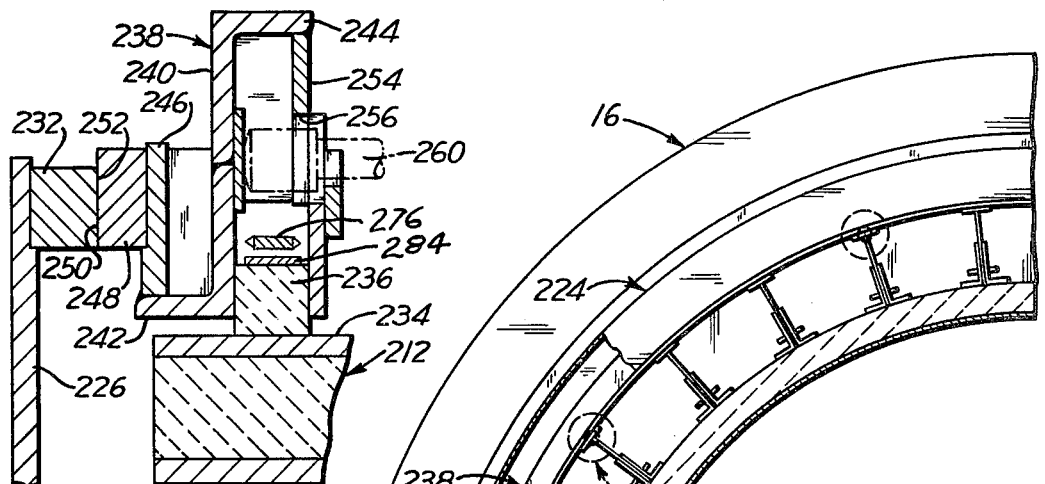
FIG. 10 is an enlarged fragmentary view in section of the seal for the discharge portion of the balling drum.

In order to provide a fluid-tight seal between the fixed center breech assembly 16 and the rotatable balling drum 12 seal assemblies designated by the numeral 224 are provided at both ends of the center breech assembly 16. The seal assembly associated with the discharge end of the balling drum 12 will be described in detail and it should be understood that the other seal assemblies are of similar construction. The balling drum 12 has an annular seal carrier ring member 226 secured to its outer wall by means of rearwardly extending plates 228. The plates 228 have flanged portions 230 welded to the outer periphery of the wall and the plates 228 have a front portion welded to the annular seal carrier ring member 226. A running seal 232 is secured to the face of the annular plate 226 secured to the balling drum 12. With this arrangement the running seal 232 moves axially with the balling drum 12 during expansion and contraction of the balling drum 12 and further rotates with the balling drum 12. The plates 228 and flanged portions 230 serve to prevent bending of the carrier ring member 226 when subjected to forces that produce longitudinal expansion of the drum 12. In FIG. 10 a portion of the annular seal carrier ring member 226 is illustrated with the running seal 232 mounted thereon.

As illustrated in FIG. 10, the annular support member 210 of breech assembly 16 has an outer cylindrical surface 234 on the portion 212. An annular static seal 236 is positioned on the portion 212 in abutting and sealing relation with the outer surface 234. The static seal 236 is arranged to move longitudinally on the annular surface 234 as the running seal 232 secured to the balling drum 12 moves toward and away from the center breech support member 210. The movable portion of the running seal includes a static seal ring assembly generally designated by the numeral 238 which is movably supported on the support member 210, as later explained. The static seal ring assembly includes a ring member 240 with a forwardly extending leg or flange 242 and a rearwardly extending leg or flange 244. An annular plate 246 is secured to the forwardly extending leg 242 in spaced relation to the ring member 240 and has an annular seal 248 secured thereto.

The seal 248 has a front surface 250 that is arranged to be maintained in abutting and sealing relation with the rear surface 252 of seal 232 secured to the seal carrier ring 226 mounted on the balling drum 12. An annular plate 254 is secured to the rearwardly extending leg 244 and depends downwardly therefrom in spaced relation to the annular ring 240. The static seal 236 is positioned between the rings 240 and 254 and is in abutting relation with the walls of the respective rings as illustrated in FIG. 10. During operation a temperature differential exists between the support member 210 and the static seal ring assembly 238. Consequently, the outer cylindrical surface 234 of support member 210 expands and contracts longitudinally as well as radially relative to assembly 238. It is the provision of the longitudinal movement of static seal ring 236 with assembly 238 that permits relative movement between support member 210 and assembly 238. The plate 254 has a plurality of spaced apertures 256 therearound. A plurality of piston cylinder assemblies 258 are secured to the outer surface 234 of support member 210 and have piston rods 260 extending therefrom. The piston rods 260, as illustrated in FIG. 10, extend through the respective apertures 256 and abut the rear surface of ring member 240. Fluid under pressure urges the piston rods 260 into abutting relation with the ring member 240 which, in turn, urges the static seal 248 in abutting relation with the running seal 232.

The seal assemblies 224 thus provide a fluid-tight seal between the balling drum 12 and the breech assembly 16. The static seal 236 and the running seal 232 and abutting static seal 248 prevent the escape of gas from the internal portions of balling drum 12 and hardening drum 14 through the center breech 16. Expansion and contraction of the balling drum 12 is compensated for by the seal assemblies 224 by maintaining the positive pressure with piston rods 260 against the static seal ring assembly 238. As the balling drum 12 expands a force is transmitted through the running seal 232 on seal carrier ring 226 to the seal 248. The force is opposed by the plate 246 to maintain the seal faces 250 and 252 in sealing relation with each other.

Suitable controls are provided for the fluid pressure in the piston cylinder assemblies 258 to permit relative movement of the static seal ring assembly 238 while maintaining the above discussed sealing relation. As the balling drum 12 contracts the seal 232 moves away from the seal 248 and the piston cylinder assemblies 258 move the seal ring assembly 238 on the support member 210 to maintain the running seal 248 in sealing relation with running seal 232. The static seal ring 236, as above discussed, moves longitudinally with the static seal ring assembly 238.

Similar seal assemblies 224 are provided for the portion of the breech assembly 16 extending over the inlet portion of the hardening drum 14 and, as is illustrated in FIG. 2, for the inlet end of the balling drum 12.

A similar seal assembly 224 is provided between the outlet end of the hardening drum 14 and the discharge end breech 24 and is illustrated diagrammatically in FIG. 1. With this arrangement the four separate seal assemblies 224 effectively seal the inner portion of the pair of drums 12 and 14 so that an inert atmosphere under positive pressure may be maintained within balling drum 12 and hardening drum 14 during the agglomeration process. The piston cylinder assemblies 258 are preferably yoke mounted on support member 210 to compensate for the relative position of balling drum 12 as the angle of inclination of the balling drum 12 is adjusted relative to the hardening drum 14.

The static seal ring assembly 238 associated with the discharge end of balling 12 is movably supported on the member 210 in the manner illustrated in FIGS. 8 and 9. The static seal ring assembly 238 has a pair of trunnion shafts 262 extending radially therefrom with rollers 264 rotatably mounted thereon. Gusset plates 266 support the trunnion shafts 262 and rollers 264. The rollers 264 are mounted on rails 268 that are supported on the breech assembly 16 within the housing 218. Thus, the rings 238 are supported on the member 210 by means of the rails 268 and are free to move axially on the member 210. Similarly the ring 238 associated with the inlet end of hardening drum 14 has trunnion shafts 270 with rollers 272 rotatably mounted thereon. The rollers 272 are supported on rails 274 secured to the breech assembly 16. With this arrangement the static seal ring assembly is supported by and free to move longitudinally on the member 210 to maintain an effective seal between the respective balling drum 12 and hardening drum 14 and the center breech assembly 16 as the drum 12 and 14 expand and contract.

The static seal ring 236 associated with the static seal ring assembly 238 of each of the seal assemblies 224 is maintained in abutting and sealing relation with the outer surface 234 of the annular support member 210 by a chain assembly generally designated by the numeral 276 and illustrated in FIG. 13. The chain assembly includes a plurality of individual chain link sections 278 that are secured together by a tightener assembly generally designated by the numeral 280 and illustrated in detail in FIGS. 14 and 15. The tightener assembly 280 is operable to exert sufficient tension in the chain link sections 278 to maintain the static seal ring 236 in abutting and sealing relation with the outer surface 234 but permit relative movement of the seal ring 236 on the outer surface 234.

The individual chain sections 278 include a plurality of link members 282 as illustrated in FIG. 13. The link members 282 are supported on the surface of the static seal ring 236 by a bearing plate, such as the steel seal band 284. End link members 283 of adjacently positioned chain link members 278 are joined together by the tightener assembly 280 that is operable to control the tension exerted on the joined chain link sections.

Each of the tightener assemblies 280 includes an arm member 286 that is pinned by its end portion to an end link member 283 of each of the chain sections 278. A pair of brace members 288 and 290 are secured to opposite sides of the arm member 286, as illustrated in FIGS. 14 and 15, and form with the lower horizontal surface of the arm member 286 a longitudinal recess 292. A second arm member 294 is slidably positioned within the recess 292 between the brace members 288 and 290. The arm member 294 is connected by a pin member to the end link member 283 of the adjacent chain link segment 278. A spacer 296 is welded to the brace members 288 and 290 and thereby maintains the respective brace members in spaced relation. The spacer 296 includes a bore 298 and a dowel pin 300 that projects outwardly from the surface of the spacer. A mounting bracket 302 having bores 304, 306 and 308 is positioned in abutting relation with the spacer 296. The dowel pin 300 extends through the bore 306 so that the bores 298 and 304 are aligned to receive a nut and bolt combination 310. With this arrangement, the mounting bracket 302 is secured to the spacer 296 and brace members 288 and 290.

A piston cylinder assembly generally designated by the numeral 312 has an end portion 314 that is positioned within the bore 308 of the mounting bracket 302. An extensible piston rod 316 extends from the end portion 314 between the brace members 288 and 290 into the recess 292 and abuts the lower portion of the arm member 294. Fluid under pressure is supplied to the piston end of the assembly 312 by a conduit 318 that is connected to the assembly by a connector 326. The conduit 318 is supported on the ring member 240 by a selected one of the manifolds 322 or 324 illustrated in FIG. 14, that are suitably secured to the ring member 240 by a coupling 326. Pressurized fluid from a source is supplied from one of the manifolds 322 or 324 through conduit 318 into the piston cylinder assembly 312. The piston rod 316 is accordingly extended from the assembly 312 to maintain the end portion of the rod in abutting relation with the arm member 294.

By controlling the fluid pressure within the cylinder and the extension of the rod 316 therefrom, the relative position of the arm member 294 within the longitudinal recess 292 may be controlled. Extension of the rod 316 urges the arm member 294 to move toward the arm member 286 and thereby increase the tension exerted on the links within the respective chain link section 278 of the chain assembly 276. Accordingly, retraction of the rod 316 into the cylinder 312 moves the arm member 294 away from the arm member 286 to thereby reduce the tension in the chain link section 278. Thus, it will be apparent that by joining the adjacent end portion 283 of the chain link sections 278 of the chain assembly 276 by the tightener assemblies 280, a preselected tension may be exerted on the chain assembly 276 to assure that the static seal ring 236 remains in abutting and sealing relation with the support member outer surface 234. In this manner, a fluid-tight seal around the respective drum members within the breech assembly is provided, and by operation of the tightener assemblies 280 the seal is maintained as the static seal ring 236 moves longitudinally relative to the respective drum member.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A rotary drum assembly comprising,
   a first cylindrical drum member having an inlet portion for receiving materials to be treated and an outlet portion for discharging the treated materials,
   a second cylindrical drum member having an inlet portion for receiving materials from said first drum member and a discharge portion for discharging further treated materials from said second drum member, said first drum member outlet portion extending into said second drum member inlet portion,
   an annular support member extending around said first drum member outlet portion and said second drum member inlet portion,
   an annular ring member secured to said first drum member outlet portion adjacent to said annular support member,
   sealing means connected to said annular support member and said first and second drum members for maintaining a fluid-tight seal between said first and second drum members,
   said sealing means having a first annular seal portion and a second annular seal portion,
   said first annular seal portion secured to said annular ring member and having an annular sealing surface,
   said second annular seal portion movably supported by said annular support member and having an annular sealing surface in abutting relation with said first annular seal portion annular sealing surface to form a first seal betwen said first drum member and said annular support member, and
   said sealing means being operable to maintain a fluid-tight seal between said first and second drum members upon axial movement of either of said first and second drum members relative to said annular support member.

2. A rotary drum assemby as set forth in claim 1 in which said annular support member includes,
   a center breech housing surrounding said first drum member outlet portion and said second drum member inlet portion,
   and wherein said sealing means includes a rotatable seal portion and a static seal portion operable to provide a fluid-tight seal between said center breech housing and said first drum member and said second drum member,
   an annular seal ring carrier mounted on said center breech housing,
   a pair of shaft members extending outwardly from said annular seal ring carrier on opposite sides thereof,
   rail members secured to said center breech housing,
   wheel members rotatably mounted on said shaft members and supported on said rail members, and
   said annular seal ring carrier arranged to move axially on said center breech housing and on said rails during expansion and contraction of said drum member associated therewith to maintain said rotatable seal portion and said static seal portion between said associated drum member and said center breech housing.

3. A rotary drum assembly as set forth in claim 1 which includes,
   a feed end breech housing surrounding said inlet portion of said first drum member and having an end wall,
   other seal means between said first drum member and said feed end breech housing to seal said inlet portion of said first drum member.

4. A rotary drum assembly as set forth in claim 1 which includes,
   a discharge breech housing surrounding said discharge portion of said second drum member and having an end wall,
   other seal means between said second drum member and said discharge breech housing to seal said outlet portion of said second drum member.

5. A rotary drum assembly as set forth in claim 1 in which said sealing means includes, an annular ring member secured to said second drum member inlet portion, a second seal having a first annular seal portion secured to said annular ring member for axial movement with said second drum member and a second annular seal portion mounted on and surrounding the outer surface of said annular support member, and said second annular seal portion positioned in abutting relation with said first annular seal portion to thereby form said second seal between said annular support member and said second drum member.

6. A rotary drum assembly as set forth in claim 5 in which said sealing means includes, pressure operated means positioned on said annular support member for urging said second annular seal portion of said second seal into sealing relation with said first annular seal portion of said second seal to thereby maintain a fluid-tight seal between said inlet portion of said second drum member and said annular support member.

7. A rotary drum assembly as set forth in claim 1 in which said sealing means includes, pressure operated means secured to said annular support member and to said second annular seal portion for maintaining said second annular seal portion annular sealing surface in abutting sealing relation with said first annular seal portion annular sealing surface.

8. A rotary drum assembly as set forth in claim 7 in which, said pressure operated means includes a plurality of piston cylinder assemblies secured to said annular support member, said piston cylinder assemblies each having an extensible piston rod with an end portion abutting said second annular seal portion to urge said second annular seal portion into abutting relation with said first seal portion to maintain a fluid-tight seal between said first drum member and said annular support member.

9. A rotary drum assembly as set forth in claim 8 in which, said piston cylinder assemblies include means to permit axial movement of said second annular seal portion relative to said first drum member to maintain said second annular seal portion in sealing relation with said first annular seal portion, and said second annular seal portion being maintained in sealing relation with said annular support member as said piston cylinder assemblies axially move said second seal portion.

10. A rotary drum assembly as set forth in claim 1 in which, said annular support member includes an outer cylindrical surface, and said sealing means includes an annular ring member movably positioned on said annular support member outer cylindrical surface, said annular ring member having a forwardly extending portion and a rearwardly extending portion, a first annular static seal member secured to said annular ring member forwardly extending portion, said first annular static seal member being positioned in abutting and sealing relation with said first annular seal portion, a second annular static seal member surrounding said annular support member outer cylindrical surface to provide a static seal between said annular ring member and said annular support member, and means for maintaining said second annular static seal member in sealing and movable relation with said annular support member cylindrical surface.

11. A rotary drum assembly as set forth in claim 10 in which said means for maintaining said second annular static seal member in sealing and movable relation with said annular support member cylindrical surface includes, a chain assembly having a plurality of individual chain link sections positioned on the surface of said second annular seal member, tightener means for securing together the end portions of adjacently positioned chain link sections to join said chain link sections, and said tightener means operable to exert a preselected tension on said joined chain link sections to maintain said second annular seal member in abutting and sealing relation with said annular support member and permit relative movement of second annular seal member thereon.

12. A rotary drum assembly as set forth in claim 11 in which said tightener means includes, a first arm member pinned to the end of one of said chain link sections, said first arm member having a pair of spaced brace members secured thereto with a longitudinal recess between said brace members, a second arm member slidably positioned within said longitudinal recess between said brace members and pinned to the end of an adjacently positioned chain link section, a piston cylinder assembly supported adjacent to said second arm member and having an extensible piston rod, said piston rod positioned in abutting relation with said second arm member within said longitudinal recess, and said piston assembly operable to extend and retract said piston rod and urge said second arm member to move toward and away from said first arm member and control the tension exerted on said chain link sections.

13. A rotary drum assembly as set forth in claim 7 in which, said pressure operated means includes a plurality of piston cylinder assemblies secured to said annular support member, said piston cylinder assemblies each having an extensible piston rod with an end portion abutting said second annular seal portion to urge said second annular seal portion into abutting relation with said first annular seal portion to maintain a fluid-tight seal therebetween.

14. A rotary drum assembly as set forth in claim 13 in which, said piston cylinder assemblies include means to permit axial movement of said second annular seal portion relative to the pair of drum members to maintain said second annular seal portion in sealing relation with said first annular seal portion, and said second annular seal portion being maintained in sealing relation with said annular support member as said piston cylinder assemblies axially move said second annular seal portion.

15. A drum assembly comprising, a drum member mounted for axial rotation and having an inlet portion and an outlet portion, a fixed nonrotatable annular support member extending around said drum member inlet portion, said annular support member having an outer cylindrical surface, a seal ring assembly nonrotatably mounted on said annular support member, said seal ring assembly being longitudinally movable on said annular support member cylindrical surface, said seal ring assembly having a body portion with an annular recessed portion adjacent to said support member outer cylindrical surface, said body portion having a first annular ring portion, with a first annular seal member secured thereto and extending forwardly therefrom, and a second annular ring portion, said second annular ring portion having a forwardly extending lower annular flange portion and a rearwardly extending upper flange portion, said first annular ring portion secured to said lower annular flange portion, a third annular ring portion having a plurality of circumferential apertures therethrough and secured to said upper annular flange portion in spaced relation to said second annular ring portion to form said annular recessed portion therebetween, a third annular seal member positioned in said recessed portion in abutting relation with said annular support member cylindrical surface to provide a static seal between said seal ring assembly and said annular support member outer cylindrical surface, said third annular seal member arranged to move longitudinally on said annular support member with said seal ring assembly.

an annular support ring secured to said rotary drum member adjacent said inlet portion, a second annular seal member secured to said annular support ring for rotation therewith, said first annular seal member positioned in abutting sealing relation with said second annular seal member, a plurality of piston cylinder assemblies secured to said annular support member, said piston cylinder assemblies each having an extensible piston rod extending through said plurality of circumferential apertures in said third annular ring portion and abutting said second annular ring portion to thereby urge said first annular seal member into abutting and sealing relation with said second annular seal member to provide a seal between said drum member inlet portion and said first annular support member.

16. A drum assembly as set forth in claim 15 which includes, means to urge said third annular seal member into abutting and sealing relation with the outer cylindrical surface of said annular support member.

* * * * *